2,862,982

REMOVAL OF ALKALI METALS FROM VISCOUS HYDROCARBON LIQUIDS

Neville Leverne Cull, Baker, and Joseph Kern Mertzweiller and Marnell Albin Segura, Baton Rouge, La., assignors to Esso Research and Engineering Company, a corporation of Delaware No Drawing. Application December 10, 1954
Serial No. 474,614

12 Claims. (Cl. 260—669)

This invention relates to a method for the removal of alkali metals from viscous hydrocarbon liquids. The invention relates more particularly to the removal of a finely dispersed alkali metal from the reaction product obtained by the polymerization of an unsaturated hydrocarbon, particularly a conjugated diolefin such as 1,3-butadiene with or without other copolymerizable monomers, e. g. vinyl aromatics such as styrene or its homologues.

It is known to polymerize various unsaturated hydrocarbons such as olefins or diolefins in the presence of alkali metals or organic compounds thereof such as their alkyl derivatives to produce polymers of high molecular weight such as resins, rubbery materials, drying oils and the like.

The products obtained by the above polymerization reactions contain the alkali metal or soluble forms thereof dispersed or dissolved therein and these must be removed prior to use in order to avoid the normal hazards due to the presence of free metal and to avoid the effects of alkalinity if the product comes into contact with water. Furthermore, the curing rates of rubber-like compounds are increased by the presence of sodium or other alkali metal, and liquid polymeric drying oils are rendered cloudy and their use in coating compositions is hindered.

It has now been found that liquid polymerization products obtained from unsaturated organic compounds by the use of alkali metal catalysts may be treated to remove the alkali metal catalyst by treating the liquid product with clays having 1–25% bound water content such as Attapulgus clay, Super Filtrol, or used cracking catalysts, e. g. silica and/or alumina gels, etc. The clays may be used alone or in combination with conventional filter aids.

The invention is particularly applicable to the preparation of drying oils by the polymerization of butadiene or the copolymerization of butadiene-styrene mixtures. In accordance with this process 60 to 100 parts by weight of butadiene-1,3 are copolymerized with 0 to 40 parts by weight of a vinyl aromatic, such as styrene, in the presence of 0.5 to 10 parts by weight (based on monomers) of an alkali metal catalyst, such as sodium; other alkali metals such as potassium, lithium, caesium or rubidium may be used. The polymerization is carried out in a reaction diluent at a temperature ranging from 25 to 105° C., preferably between 40 and 85° C., either batchwise or in a continuous process. Materials used as diluents in the polymerization are inert hydrocarbons which remain liquid under the reaction conditions employed. Diluents boiling between about −15 and 200° C. are therefore suitable. The diluents are employed in amounts ranging from 50 to 500, preferably 200 to 300, parts per 100 parts of monomers.

It is also desirable to employ about 10–40 parts of an ether promoter per 100 parts of monomers. It is also posisble to employ the ether as the sole diluent in the process in which case the larger quantities as described above are used. The use of the ethers are highly desirable since they improve the reproductibility of the process, shorten the initial induction period and are particularly effective in producing a substantially colorless product. Particularly suitable ethers are dioxane when a batch process is used and diethyl ether when a continuous process is used. However, the ethers may be used interchangeably in either of these methods.

It is also desirable to include 1 to 35 parts by weight of an alcohol in the recipe to activate the catalyst. Suitable alcohols include methanol, isopropanol, normal pentanol and the like.

The process of the present invention is particularly applicable to the multi-stage continuous process described and claimed in Serial No. 420,498, filed April 2, 1954, in the name of Stanley E. Jaros et al., now abandoned. The disclosures of this application are incorporated herein by reference.

According to one embodiment of the invention, liquid products obtained by the above polymerization processes are passed through a filter or column containing an acid-clay such as Attapulgus clay or the like. According to another embodiment, the product is mixed with the clay by agitation, allowing sufficient time for neutralization of the catalyst, and the oil-clay mixture is filtered, e. g. through a rotary-type filter. In still another embodiment the product is first filtered, settled or centrifuged to remove the bulk of the alkali metal catalyst, followed by percolation of the filtrate through a column packed with the clay.

It is therefore one object of this invention to remove finely dispersed alkali metal from a hydrocarbon liquid.

It is another object of this invention to remove alkali metal alkyls and other similar highly reactive and soluble compounds of alkali metals from inert liquids.

It is a further object of this invention to polymerize an unsaturated organic compound in the presence of a catalytically active form of an alkali metal and subsequently recover a resulting polymeric material free from said alkali metal.

Other objects and advantages of this invention will become apparent to one skilled in the art from the accompanying disclosure and discussion.

It is an important feature of this invention that a final product free from alkali metals can be obtained only by contacting the polymer oil with clay containing carefully controlled amounts of water. The water content of the clay should be between 1 and 25 wt. percent, preferably between 10 and 20%, and should be firmly bound therein. If desired, the clay may be acid-treated but care must be taken during the subsequent drying step to avoid the loss of too much moisture. In general conventional oven drying for 16 hours at 190° F. is too drastic while air drying, even for as much as 100 hours, is satisfactory. When acid-treated clay is used, the moisture content of the clay must not be over 1.5 to 2%, otherwise the treated oil will have a yellow color. When low-moisture content clays are acid treated and used in accordance with this invention, water-white products are obtained. If desired, a two-stage process can be used wherein a clay having a moisture content of 10–25% can be used in the first stage and the effluent from this stage can be percolated through an acid-treated clay of 1.5 to 2% water content. 1–25 wt. percent of clay, based on polymer oil, is sufficient to completely neutralize the polymer oil.

The present invention can be used to remove an alkali metal from any liquid which is inert with respect to the clay under the conditions of treatment. It has particular application to hydrocarbon solutions of polymers produced by the catalytic action of an alkali metal upon unsaturated hydrocarbons as discussed above. It applies particularly to treating hydrocarbon solutions of polymers made by polymerization in solution of conjugated diolefins, such as butadiene-1,3, isoprene, or 2,3-dimethylbutadiene-1,3, either alone or in admixture with each other and/or with minor amounts of other monomers copolymerizable therewith such as myrcene, styrene, methyl styrene, vinyl naphthalene or the like.

Advantages of this invention are illustrated by the following examples. The reactants, and their proportions, and the other specific ingredients of the receipes are presented as being typical and should not be construed as limiting the invention thereto.

*Example I*

A butadiene-styrene drying oil was prepared from the following charge:

| | Parts |
|---|---|
| Butadiene-1,3 | 80 |
| Styrene | 20 |
| Varsol (B. P. 150–200° C.) | 200 |
| Dioxane | 40 |
| Isopropanol | 0.2 |
| Sodium (10–50 microns) | [1]1.5 |
| Temperature 50° C. | |

[1] Based on monomers.

A portion of the crude reaction product was centrifuged and filtered through fluted paper to give a water-white product free of any suspended material. A drop of phenolphthalein solution added to the filtered product gave an intense red color indicating residual alkalinity.

Another portion of the crude product was filtered on a Buchner filter using Attapulgus clay as a filter aid. The residue gave no reaction with water indicating neutralization of the catalyst. The filtrate was water-white and gave no basic test when treated with phenolphthalein.

*Example II*

One hundred grams of a 15% sodium dispersion were added to 1000 grams of the crude polymer oil of Example I. After stirring the product was filtered through a Buchner funnel using Attapulgus clay. The filtrate was water-white and showed no alkalinity when treated with phenolphthalein. The filter cake gave no reaction when treated with water. When the sodium dispersion in the polymer oil was added to the clay a temperature rise of about 25° F. was noted and gas was evolved.

*Example III*

Twenty grams of a 15% sodium dispersion were added to 300 grams of the crude polymer oil of Example I followed by the addition of 5 wt. percent of Attapulgus clay having a water content of about 20%. The mixture was stirred for about 10 minutes and a temperature rise of 22° F. was noted. The filtrate was water-white but basic to phenolphthalein. The filter cake gave no evidence of reaction with water.

*Example IV*

Twenty grams of a 15% sodium dispersion were added to 300 grams of the crude polymer oil of Example I followed by the addition of 3 wt. percent of an acid-treated Attapulgus clay which had been oven-dried for 16 hours at 190° C. A 3–4° F. temperature rise was noted on stirring. The filtrate was water-white and basic to phenolphthalein. The filter cake reacted with water giving off a gas thus indicating the presence of unreacted sodium.

*Example V*

Various amounts of Attapulgus clay and Filtrol D were added to samples of the polymer oil of Example I. The Attapulgus clay was used with and without acid treatment. The acid-treated clay was both air-dried and oven-dried. The suspension was stirred for 10–15 minutes and filtered through a Buchner funnel in the presence of a conventional filter aid. The following results were obtained:

| Run No. 8160- | Clay | Weight percent clay added | Treatment of clay | Weight percent volatile [1] | Filtrate Color | Filtrate Phenol-phthalein |
|---|---|---|---|---|---|---|
| 105 | Attapulgus | 1 | No treatment | 11–12 | Water white | Basic. |
| 105 | do | 3 | do | 11–12 | do | Do. |
| 105 | do | 5 | do | 11–12 | do | Do. |
| 105 | do | 10 | do | 11–12 | do | Do. |
| 105 | do | 20 | do | 11–12 | do | Acid. |
| 106 | Filtrol D | 3 | do | 19–20 | do | Basic. |
| 106 | do | 5 | do | 19–20 | do | Do. |
| 106 | do | 10 | do | 19–20 | do | Do. |
| 106 | do | 20 | do | 19–20 | do | Acid. |
| 107 | Attapulgus clay acid treated [2] | 2 | Oven dried 16 hrs. at 190° F. | 1.5–2.0 | do | Basic. |
| 107 | | 5 | do | 1.5–2.0 | do | Acid. |
| 107 | | 5 | Air dried 16 hrs | 49–50 | Yellow | Basic. |
| 107 | | 5 | Air dried 40 hrs | 35–36 | do | Do. |
| 107 | | 5 | Air dried 100 hrs | 22–23 | do | Do. |

[1] Wt. percent loss on ignition 3 hours at 190° F.
[2] Aqueous solution of 10% $H_2SO_4$ acid added to the clay.

The above results show that the acidity or basicity of the filtered product can be varied by the amount of clay used and by the use of acid-treated clay. However, when acid-treated clay was used, the air-dried clay gave a yellow product. However, as shown, in Example IV, the acid-treated oven dried clay did not neutralize all of the sodium as indicated by the reaction of the residue with water or acetic acid.

The data in Example III also show that 2–3 wt. percent of clay is sufficient to neutralize each 1% sodium used in the synthesis step. For complete neutralization of all residual alkalinity, as much as 20% clay may be required; acid-treated clays are generally more efficient in this respect.

As will be evident by those skilled in the art, various modifications of this invention can be made or followed in the light of the foregoing disclosure and discussion without departing from the spirit or scope of the disclosure of the claims.

The nature of the present invention having been thus fully set forth and specific examples of the same given, what is claimed as new and useful and desired to be secured by Letters Patent is:

1. A process for removing alkali metal from a liquid oily hydrocarbon polymer containing it in suspension which comprises intimately contacting said hydrocarbon with an acid clay containing 1–25% by weight of bound water.

2. Process according to claim 1 in which the hydrocarbon is filtered through the clay.

3. Process according to claim 1 in which the hydrocarbon is first treated to separate the bulk of the alkali metal and then percolated through the clay.

4. Process according to claim 1 in which the oil is first mixed with the clay and then filtered.

5. Process according to claim 1 in which the clay is acid-treated.

6. In a process for polymerizing a conjugated diolefin while dissolved in an inert hydrocarbon liquid in the presence of finely divided alkali metal catalyst and recovering a resulting solution of polymeric material containing alkali metal impurities, the improvement which comprises contacting the said hydrocarbon solution with an acid clay containing 1–25 wt. percent of bound water.

7. In a process for the treatment of a liquid copolymer produced by solution polymerization of 1,3-butadiene and styrene in the present of metallic sodium as the catalyst and in which a resulting liquid polymer is obtained which contains metallic sodium or dissolved sodium derivatives as impurities, the improvement which comprises treating the said liquid polymer with 1–25 wt. percent of an acid clay containing 1–25 wt. percent of bound water so as to remove all the sodium from the liquid.

8. A process for removing suspended alkali metal from a liquid hydrocarbon polymer which comprises intimately contacting said polymer with an acid-treated clay containing between about 1.5 to 2 wt. percent water.

9. In a process for polymerizing a hydrocarbon olefin while dissolved in an inert hydrocarbon liquid in the presence of a finely divided alkali metal catalyst and recovering a solution of polymeric material containing alkali metal impurities, the improvement which comprises contacting said solution with about 2 to 3 wt. percent of acid clay containing 10 to 25% bound water for each 1 wt. percent of alkali metal catalyst used in the polymerization.

10. In a process for the treatment of a liquid copolymer produced by solution polymerization of 1,3-butadiene and styrene in the presence of an alkali metal and in which a resulting liquid polymer is obtained which contains alkali metal and alkali metal derivatives as impurities, the improvement which comprises mixing the liquid copolymer with a sufficient amount of acid clay to neutralize the metallic sodium and sodium derivatives, filtering the copolymer-acid clay mixture and recovering a purified liquid copolymer.

11. In a process for the treatment of a liquid copolymer produced by solution polymerization of 1,3-butadiene in the presence of an alkali metal and in which a resulting liquid polymer is obtained which contains alkali metal and dissolved alkali metal derivatives as impurities, the improvement which comprises percolating the said liquid polymer in a first stage through a column of clay containing 10 to 25% water and then passing the effluent from the said first stage through a column of acid-treated clay containing about 1.5 to 2% water.

12. In a process for the treatment of a liquid copolymer produced by solution polymerization of 1,3-butadiene and styrene in the present of metallic sodium and in which a resulting liquid polymer is obtained which contains metallic sodium and sodium derivatives as impurities, the improvement which comprises removing the bulk of the metallic sodium and sodium derivatives from the liquid copolymer, percolating the liquid copolymer in a first stage through a column of acid clay containing 10 to 25 wt. percent water and then passing the effluent from said first stage through a column of acid-treated clay containing about 1.5 to 2 wt. percent water and recovering a purified liquid copolymer.

References Cited in the file of this patent
UNITED STATES PATENTS

| | | |
|---|---|---|
| 2,264,811 | Rothrock | Dec. 2, 1941 |
| 2,687,985 | Porter et al. | Aug. 31, 1954 |

FOREIGN PATENTS

| | | |
|---|---|---|
| 735,521 | Great Britain | Aug. 24, 1955 |

OTHER REFERENCES

"Condensed Chemical Dictionary," pages 171 and 303 (1942), Reinhold, N. Y.

Mantell: Adsorption, pages 46 and 73–74 relied on (1945), McGraw-Hill Book Co., N. Y.